July 17, 1962        J. W. BEATTY        3,045,117

IMAGE INTENSIFYING PHOTOSENSITIVE FILM

Filed Nov. 20, 1957

INVENTOR.
JOHN W. BEATTY
BY
ATTORNEYS

United States Patent Office 3,045,117
Patented July 17, 1962

3,045,117
IMAGE INTENSIFYING PHOTOSENSITIVE FILM
John William Beatty, Dayton, Ohio, assignor to the United States of America as represented by the Secretary of the United States Air Force
Filed Nov. 20, 1957, Ser. No. 697,755
1 Claim. (Cl. 250—49.5)
(Granted under Title 35, U.S. Code (1952), sec. 266)

The invention described herein may be manufactured and used by or for the United States Government for governmental purposes without payment to me of any royalty thereon.

This invention relates to a method of photographing objects under conditions of low level illumination. More particularly, the invention is concerned with the night aerial photography of ground objects from relatively high and fast flying aircraft using only the normal available illumination of moonlight and starlight.

In the practice of night aerial photography for reconnaissance, one of the major problems encountered is the lack of sufficient illumination of the ground object to be photographed. One method of overcoming this problem when using the strip type camera is to increase the width of the exposure slit, thus allowing a longer film exposure time in order to obtain negatives of satisfactory density. However, any substantial widening of the slit results in a marked decrease in resolution of the image and, consequently, lacking in definition as well as sharpness. While an exposure slit of about .010 of an inch in width is ordinarily used for daytime photography, the present practice is to use a slit one-half inch wide for night photography.

The present invention provides a method whereby the same narrow exposure slit of about .010 of an inch may be used in night photography resulting in resolution and sharpness equivalent to that obtained when photographing objects from the air in the daytime. Using the same type film, such as class N, and the same width exposure slit (around .010 of an inch), negatives can be obtained at night by moonlight or starlight which compare in resolution and definition to those obtained in daytime aerial photography, where the light from the sun provides the illumination. This is accomplished by amplifying and intensifying the light from the dimly illuminated object after it passes through the camera lens and before it impinges on the film to form the latent image. The sensitized film has superimposed thereon a series of laminae which convert the incident light rays in the form of photons from the object in the field of view of the camera into electrons. The intensity of the electrons is increased by passing through a series of progressively more positively charged laminae and reconverted to photons of materially amplified magnitude. The amplified photons then impinge on the sensitized film and act to form a latent image which, after being developed, results in a negative of far superior quality than that which could have been obtained by using the unamplified incident light which entered the lens of the camera originally.

Consequently, the primary object of the invention is to provide a means for obtaining high resolution photographs of objects at night with low level illumination conditions.

Another object of the invention is to increase the effective sensitivity of photographic film by combining means for intensifying the light which passes into the camera from the object being photographed with the photosensitive film thereby increasing the brightness and definition of the resulting negative.

Still another object of the invention is to provide means whereby the width of the exposure slit of a strip type camera being used to photograph dimly illuminated objects may be substantially reduced and yet result in a negative of sufficient density and contrast. This consideration is particularly important during night reconnaissance flights when photographing terrain using only the available moonlight or starlight for illumination.

These and other objects, features and advantages will become more apparent after considering the following detailed description taken in connection with the annexed drawings wherein.

The publication "Television" by V. K. Zworykin and G. A. Morton published in 1940 by John Wiley and Sons, Inc., discusses in detail numerous photoemissive, secondary emissive, and cathodoluminescent materials which are suitable for utilization in the construction of the light amplifying portion of the present invention. Reference is also made to said publication for information as to the value of the various positive potentials which are applied to the successive secondary emissive layers. As noted in "Television," supra, these potentials depend on a number of factors and preferable positive potentials are ones which produce the maximum secondary emission ratios at the different laminae. Other construction details of the light amplifier may be found in United States Patent No. 2,594,740.

Figure 1:
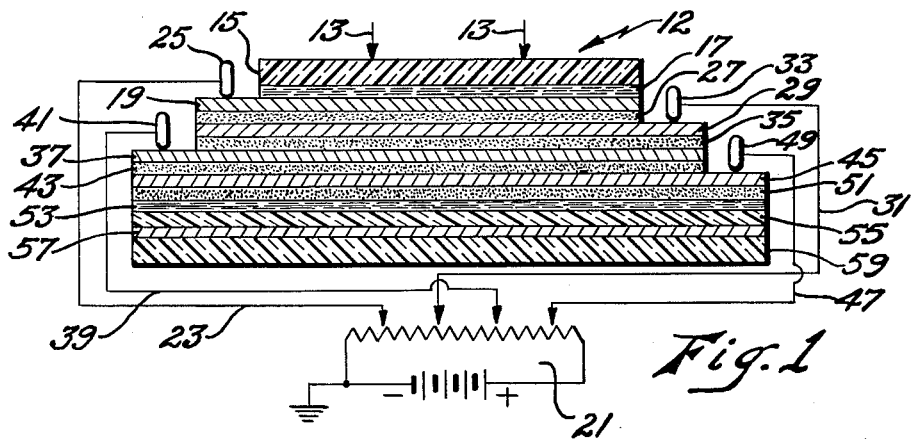
FIG. 1 is a cross-sectional view of the photosensitive film with the intensifying laminae attached as well as a schematic diagram of the electrical circuits involved in accelerating the electrons.

Referring now to FIG. 1, which shows a cross-sectional view of the laminated structure of the combined photosensitive film and intensifying lamina 12, the light rays 13, after passing through the camera lens, enter and pass through the transparent protective lamina 15 and impinge on a lamina of photoemissive material 17. This lamina 17, which is sensitive to radiation in the form of a beam or ray of light, acts to transform the light rays 13 into rays of electrons.

The electron ray emitted by the photoemissive lamina 17 then impinges on the electrically conductive lamina 19. A small positive potential is applied to the conductive lamina 19 from a voltage divider 21 through the line 23 and the roller contact 25. This acts to accelerate and intensify the electron ray which was emitted by lamina 17 so that substantially all of the emitted electrons pass through to the adjacent superimposed lamina 27. Lamina 27 is constructed of secondary emissive material in order that the intensified electron ray passing through the conductive lamina 19 will excite this secondary emissive laminae 27 thereby producing an emission which is proportional to that emitted by the photoemissive lamina 17 but substantially greater in intensity.

The process is repeated when the secondary emission from lamina 27 is further intensified by passing through a second conductive lamina 29 to which a higher positive potential is applied through the line 31 and the roller contact 33. Another secondary emissive lamina 35 is excited and emits the further intensified electron ray which acts upon a third conductive lamina 37. A still higher positive potential is applied to this conductive lamina 37 through the line 39 and the roller contact 41 resulting in a still further intensification of the electron ray. A third secondary emissive lamina 43 excited by electrons passing through the third conductive lamina 37 emits an electron ray which acts on a fourth conductive lamina 45. An even higher positive potential is applied to this fourth conductive lamina 45 through the line 47 and the roller contact 49 which further intensifies the electron ray and passes it to the fourth secondary emissive lamina 51. As in the case of the other secondary emissive laminae, this fourth secondary emissive lamina 51 transmits the greatly magnified electron beam to the next adjacent lamina which in the embodiment shown consists of a lamina of cathodoluminescent material 53 having the properties of being electron-sensitive and radiation-emissive thereby transforming the amplified electron ray into an amplified light ray consisting of photons.

These photons then pass through a lamina of transparent strippable film 55 and impinge on the film emulsion 57 coated on the film base 59, thereby exposing the photosensitive film emulsion 57. The film emulsion and base, 57 and 59, is then stripped from the amplifying laminae and processed in the conventional manner. The resultant negative has density, brilliancy, and contrast many times greater than that which could have been obtained by using the ambient light alone as the exposing medium.

The thickness of the various laminae which constitute the combined photosensitive film and amplifying system has been greatly exaggerated in order to more clearly illustrate the relative positions of the laminae. Ordinarily, the conducting laminae 19, 29, 37 and 45 and the secondary emissive laminae 27, 35, 43 and 51 are each about 0.0001 to 0.001 inch in thickness. The photoemissive and cathodoluminescent laminae, 17 and 53 respectively are extremely thin coatings of about the same thickness of the other laminae. The clear plastic protective lamina 15 may consist of a thin sheet of cellulose acetate and the laminae 55, 57 and 59 comprise a sheet of conventional photosensitive film with a thin stripping film superimposed thereon. Thus, the actual thickness of the combined amplifier and film as illustrated is of the order of magnitude of 0.01 and 0.1 inch.

Figure 2:
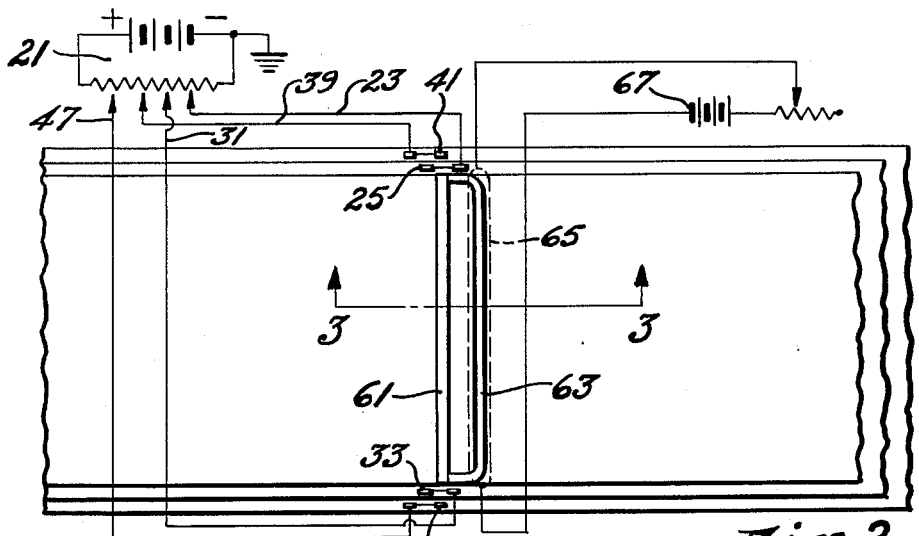
FIG. 2 is a top diagrammatic view showing the exposure slit and the electrical connections to the intensifying laminae and to the electromagnetic means for preventing lateral spread of the moving electrons.
Figure 3:
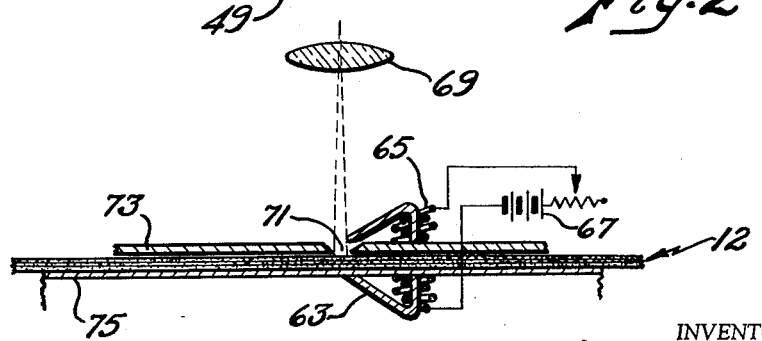
FIG. 3 is a diagrammatic view showing the side elevation of the camera along the line 3—3 of FIG. 2.

In using the above described system it is necessary to include a means for controlling and directing the electron ray as it passes through the various amplifying laminae. FIGS. 2 and 3 show the combined light amplifier and film as used in an aircraft slit-type camera. In this application the camera slit 61 is surrounded by a magnetic field obtained by electrically magnetizing the core members 63 located above and below the photosensitive film 12. The windings 65 are wound parallel to the desired path of the electron beam as it passes through amplifying laminae and are connected in series with the battery 67 causing the passage of current which forms the necessary magnetic field. The core members 63 act to create lines of flux which direct the electron ray through the amplifying lamina and prevent lateral spreading of electrons thereby resulting in a reproduced image which is an exact photographic reproduction of the original image and many times brighter than it.

In FIG. 3 there is shown a cross-sectional diagrammatic view of an application of the invention for use with the slit type aerial camera. The lens 69 admits light rays which pass through the camera and into the camera slit 61 formed in the opaque enclosure member 73. The light rays are then transformed into electron rays, amplified, and retransformed into light rays which impinge on the photosensitive portion of the laminated structure 12. The camera vacuum platen 75 acts to support and keep the laminate flat and in the proper plane with respect to the camera lens 69.

Although the invention has been described as particularly useful in night aerial photography, it is clear to see that amplified light photography has many other useful applications. For example, a camera equipped with the invention described may be used to photograph the progress of earth satellites through outer space. In this application a conventional view camera may be modified to include the amplifying laminae with the necessary electrical circuits shown. This would allow a dimly lit earth satellite of the type recently launched to be photographed from the earth's surface even though the ambient light available would ordinarily be insufficient to obtain a satisfactory photograph using an unmodified conventional camera.

It will be apparent to those skilled in the art that the disclosed invention may be useful for other purposes besides those shown and described and it should be understood that various changes and modifications can be made to the embodiment described without departing from the spirit and scope of the invention.

Having thus described my invention, what I claim as new and desire to secure by Letters Patent of the United States is:

An apparatus for photographically recording the image of a dimly illuminated distant object radiating light energy to be photographically reproduced, said apparatus comprising an enclosure having a slit for receiving said light energy, an intensifier moveable to pass beneath said slit to receive and amplify said light energy, said intensifier including a plurality of laminae, at least one of said laminae operating to convert light energy to electrical energy, another of said laminae being electrically conductive, a series of roller contacts on said enclosure and connected to said electrically conductive laminae and a source of positive potential to accelerate the flow of electrons through said electrically conductive laminae, and another of said laminae operating to reconvert the electrical energy in the form of accelerated electrons back to light energy, magnetic means surrounding said slit for producing a magnetic field having lines of force extending in the direction normal to the plane of said intensifier, and film means in contact with the side of said intensifier opposite said slit and moveable with said intensifier for recording said light energy amplified by said intensifier.

References Cited in the file of this patent

UNITED STATES PATENTS

| | | |
|---|---|---|
| 2,060,977 | De Boer | Nov. 17, 1936 |
| 2,482,815 | Urbach | Sept. 27, 1949 |
| 2,372,170 | Baker | Mar. 27, 1952 |
| 2,594,740 | De Forest et al. | Apr. 29, 1952 |
| 2,630,534 | Heinecke | Mar. 3, 1953 |
| 2,834,889 | Fries | May 13, 1958 |
| 2,866,903 | Berchtold | Dec. 30, 1958 |
| 2,883,543 | Wohl | Apr. 21, 1959 |